INVENTORS
RONALD J. BORRUP
HAROLD C. DAVIS, JR.

INVENTORS
RONALD J. BORRUP
HAROLD C. DAVIS, JR.
BY Joseph K. Schofield
ATTORNEY

2,896,056
ELECTRIC THERMO CONTROL CIRCUIT

Ronald J. Borrup, Glastonbury, and Harold C. Davis, Jr., Cheshire, Conn.

Application September 20, 1955, Serial No. 535,354

1 Claim. (Cl. 219—20)

This invention relates to control systems, and more particularly to control means to maintain stable temperatures of air in an enclosed space.

One object of the invention is to provide electrical sensing means to regulate the heat-transfer relationship between an object, such as a room or cabinet, and an energy-transforming means capable of heating or cooling said object.

Another object of the invention is to provide electrical sensing means to control the output of a mechanical heat-absorbing or heat-radiating system.

A further object of the invention is to provide a control system for heat-transfer mechanisms or systems having sensing means responsive to convection currents of air from said heat-transfer means.

Still another object of the invention is to provide sensing means including electrical resistance means having a conductivity characteristic which is responsive to temperature changes to actuate electro-mechanical means for regulating said temperature.

A feature of importance of the invention is that means are provided which will quickly actuate the controlling means for the input circuit and thereby minimize chatter and wear of the switch contacts.

And another feature of the invention is to provide a temperature control circuit which will enable the "on-off" cycle timing of the current to the heating device to be varied so as to attain greater efficiency, closer temperature regulation and longer life of the mechanical and electrical components.

With the above and other objects in view, the invention may include the features of construction and operation set forth in the following specification and illustrated in the accompanying drawings.

In the accompanying drawings annexed hereto and forming a part of this specification, we have shown the invention embodied in control systems for heating or cooling air in an enclosed space but it will be understood that the invention can be otherwise embodied and that the drawings are not to be construed as defining or limiting the scope of the invention, the claim appended to this specification being relied upon for that purpose.

In the above mentioned drawing, there have been shown several embodiments of the invention which are now deemed preferable, but it is to be understood that changes and modifications may be made within the scope of the appended claim without departing from the spirit of the invention.

Figure 1:
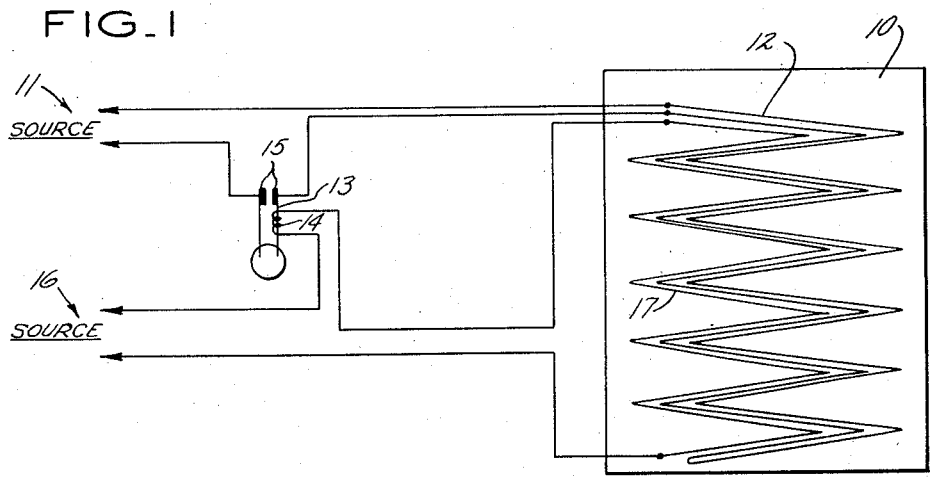
Fig. 1 is a schematic diagram of one form of the invention.

Referring more in detail to the figures of the drawing it will be seen that in Fig. 1 an energy transforming means has been provided for an enclosed space 10, which includes an electric circuit having a source of energy 11, an electrical heating element 12, and thermo-responsive switch means which may comprise the usual thermostatic switch having a bimetallic element 13, arranged to be responsive to heat supplied by electric heating means 14 to either close, or open, contacts 15 thereby connecting or disconnecting heating element 12 with the source of electricity 11. To regulate the operation of the heating element 12, a sensing circuit is provided which may be supplied with electric energy from the source 11, or from another source 16, which includes the heater 14, connected in series with a sensing circuit 17 which may be formed by an electric resistance element such as a wire having an electrical conductivity which varies in accordance with its temperature. If, for example, the sensing means 17 comprises nickel, or iron, wire its conductivity will decrease as its temperature rises and it can be said to have a positive temperature coefficient of resistance. On the other hand, if the material forming the sensing means 17 comprises silicon, or certain copper-nickel alloys, its conductivity will increase with temperature and it will have a negative temperature coefficient of resistance. In the arrangement shown in Fig. 1, the sensing means 17 has, for the purpose of illustration only, a positive temperature coefficient of resistance and it is disposed in the space 10 in a manner such that convection or radiation of heat from the heating element 12 will continuously come in contact with it. Similarly, it will be assumed that the bimetallic element 13 is arranged so that under normal conditions, wherein no heat is being supplied by the heater 14, the contacts 15 will be in open position to disconnect the heating element 12 from the supply 11.

Operation of the system under the above conditions is as follows: electric current from the supply 16 flowing through heater means 14 and the resistance 17 will eventually cause the bimetallic element 13 to close the contacts 15 to connect the heating element 12 to the electrical source 11. As long as the capacity of the heating element 12 is in excess of the requirements of the air in the space 10 to compensate for ordinary heat losses the temperature of the air will be increased by continued operation of heating element 12, and this heated air will be carried by convection or radiation into contact with the resistance member 17 thereby causing an increase in the temperature of the resistance member 17 and a corresponding increase in its electrical resistance. This increase in resistance serves to reduce the current flowing in the heating means 14 until, at a predetermined condition the heater coil 14 will no longer supply sufficient heat for the bimetallic element 13 to maintain contacts 15 in their closed position so that at this point the heating element 12 will be disconnected from its supply 11. As a result, the temperature of air in the space 10 and also that of resistance 17 will be gradually lowered until, again a predetermined condition will exist when the conductivity of this resistance 17 will be sufficient to allow current to flow in heater 14 to produce heat which will cause bimetallic arm 13 to close contacts 15 to repeat the above cycle of operation, the net result of which will be to maintain relatively stable temperature of air in the enclosed space 10.

In the foregoing description of the operation of the system it was stated that the sensing means 17 comprised a resistance element having a positive temperature coefficient of resistance, in which case the arrangement of the thermo-responsive device was such that contacts 15 would be closed as a result of increases in the heat supplied by the heater means 14. It will therefore be obvious to those skilled in the art that the sensing means 17 may comprise an element having a negative temperature coefficient of resistance whereby increase in the temperature of the element 17 will result in increased flow of current. The supply of increased heat in the heater means 14 therefore would increase and it would be obvious to arrange the thermo-responsive device to close contacts 15 with decreases in the heat supplied by heater 14, and viceversa, and that the principle of operation would be essentially similar to that just described.

Figure 2:
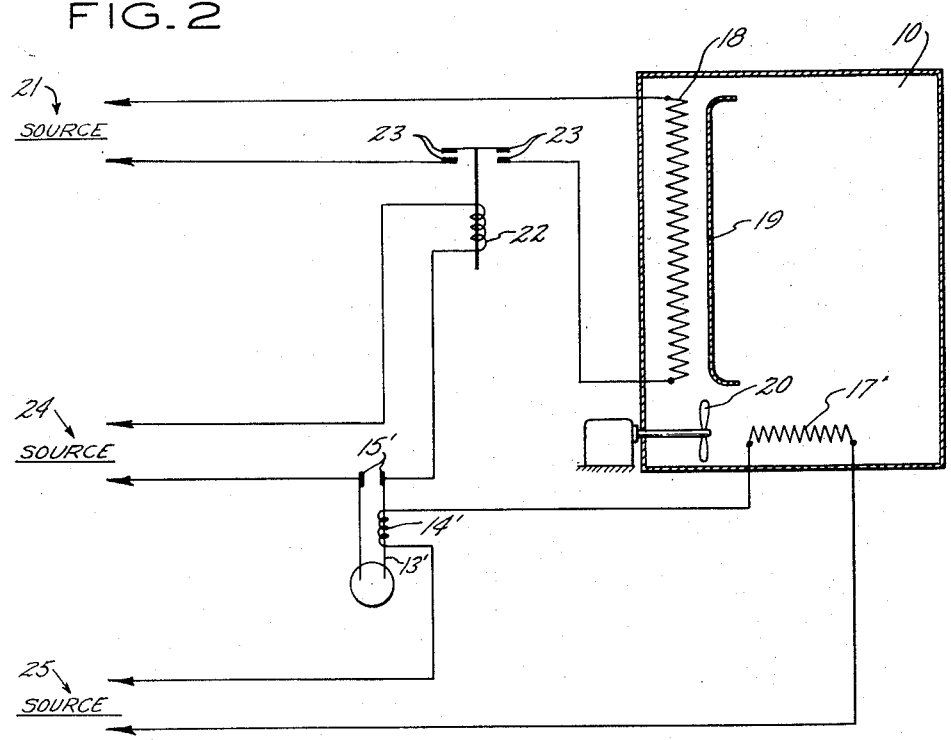
Fig. 2 is a schematic diagram of a modified form of control system.

In Fig. 2 there is shown a modified form of the invention wherein the energy-transforming means may include an electrically heated radiating means 18 in the space 10, which may be provided with an air-circulating means having a baffle means 19 and a device such as the motor-driven blower 20. Electric current from a source 21 is supplied to the heater element or coil 18 under the control of an electro-mechanical switch means which may comprise a conventional solenoid switch 22 having electrical contacts 23. Current for the solenoid 22 may be furnished from an independent source 24, or can be supplied from the source 21, and the circuit for the solenoid is controlled by the opening and closing of contacts 15' which form part of an electrically-energized sensing circuit similar to that described in connection with the system shown in Fig. 1, wherein a resistance element 17', having electrical conductivity which varies in accordance with the temperature of the resistance, controls the output of a heater means 14', to actuate the bimetallic element 13' by regulating the flow of current from the source 25. As in previous instances, the source of electricity 25 may be independent of the sources 21 and 24, or any combination of them may comprise a single source of electric potential.

Operation of the circuit which includes the elements 13', 14', 15' and 17' in Fig. 2 is similar to that of the equivalent elements shown in Fig. 1, it being evident that whereas the contacts 15 in the first form complete the circuit directly for the heating element 12, in the second modification the contacts 15' serve to actuate the solenoid 22 and thus, indirectly control the supply of electricity from source 21 to the electrical radiating means 18. In this connection it should be noted that two alternative arrangements are possible for the operation of contacts 15' and 23. Contacts 23 may be biased to remain either normally open, or normally closed, in the absence of current in the solenoid 22 and, therefore irrespective of whether the temperature coefficient of resistance of the sensing resistance 17' is positive or negative the bimetallic element 13' may be arranged either to open, or to close, contacts 15' on increase of heat in the element 14'. For example, if resistance 17' has a positive temperature coefficient of resistance 17', and the contacts 15' are arranged to close with a decrease in heat supplied by heater 14', which is opposite the arrangement of Fig. 1, then proper operation of the heat radiating means 18 can be secured by biasing the contacts 23 to their closed position so that the circuit for means 18 will be broken when current is supplied to solenoid 22 by closure of contacts 15'.

Figure 3:
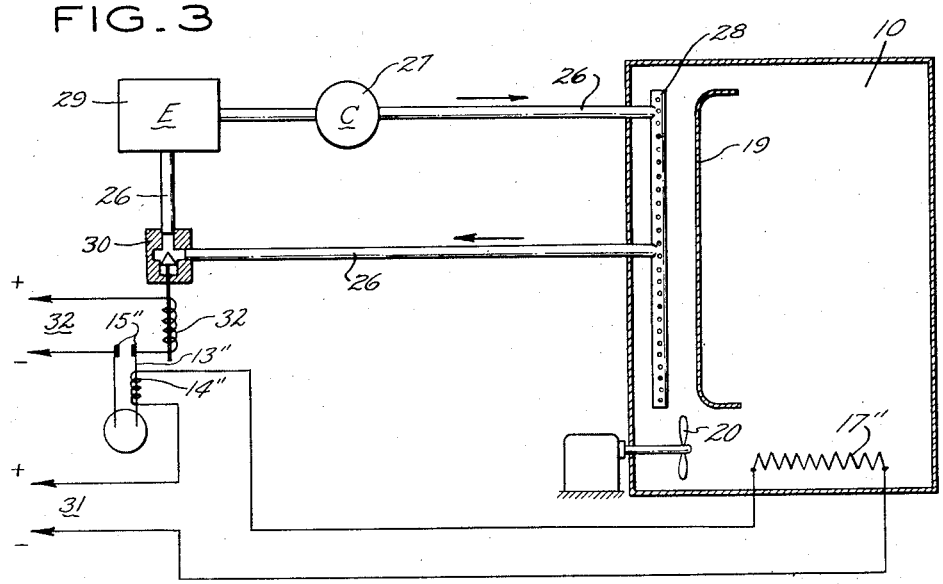
Fig. 3 is a schematic diagram of still another modification of a control system embodying mechanical heat-transfer apparatus.

In the embodiment of the invention shown in Fig. 3 the energy-transforming means may comprise a mechanical system including a closed circuit 26 for a fluid medium, such as Freon, ammonia or other refrigerant, which when compressed to a liquid state gives up heat, and conversely absorbs heat when allowed to expand and evaporate from its liquid to gaseous state. The circuit 26 includes compressor means 27, energy-transferring means such as the condenser or radiator 28, evaporator means 29, and valve means 30 to control the pressure developed in the system by the compressor 27, arranged in a manner which is well understood in the field of refrigeration and heating.

One feature of the embodiment of the invention shown in Fig. 3 is that it is not limited to a system for heating, but may also be employed for cooling an object or a volume of air such as is contained in the enclosed space 10, depending upon which of the energy-transferring means, the evaporator 29 or the condenser 28, is to be utilized. In Fig. 3 the radiator, or condenser, 28 is positioned in the enclosed space for purpose of supplying heat to the ambient air contained therein, but with obvious changes in the arrangement of elements in the system it would be equally feasible to arrange the evaporator 29 in the space 10 for the purpose of cooling the air therein. As in the case of the form of invention shown in Fig. 2, baffle means 19 and a blower 20 may be provided to circulate air.

The sensing means for the form of invention shown in Fig. 3 may include a thermo-responsive switch means having a bimetallic element 13" movably responsive to a heater means 14" to open and close contacts 15" according to changes in the heat given off by heater 14" which is electrically energized from a source 31 and connected in series with the sensing resistance 17" whose conductivity varies with its temperature. Closure of contacts 15" will energize the solenoid 32 connected with the electrical supply 33, to actuate the valve means 30.

Operation of the arrangement shown in Fig. 3, wherein the condenser for the fluid medium is placed in the space 10 to furnish heat, is generally similar to that of the previously described forms of invention shown in Figs. 1 and 2. If the resistance means 17" has a positive temperature coefficient of resistance it will initially permit enough current to flow in the heater 14" to cause the bimetallic element 13" to close contacts 15" to energize solenoid 32. Under such conditions valve 30 will be biased to remain open when the coil 32 is deenergized whereby relatively little pressure will be built up in the closed system which includes the condenser 28 and compressor means 27 and substantially no heat will be radiated. Valve 30 will also be arranged to partially, or fully, close when coil 32 is energized in which case fluid in the condenser 28 will tend to become liquified with consequent radiation of heat.

However, when arranged to heat the space 10, and with valve 30 in the position to develop pressure in the closed system 26, heat radiated from the condenser 28 will gradually raise the temperature of the resistance means 17" and increase its resistance to some predetermined extent when the flow of current through heater 14" will be insufficient to maintain contacts 15" in closed position, at which point the circuit for solenoid 32 will be broken and valve 30 will open to cause a return to the condition wherein substantially no heat is being furnished by the condenser 28. As the temperature thereafter drops in the space 10 and the resistance 17" cools off, sufficient flow of current in heater 14" will again take place and the cycle will be repeated.

It will be obvious that fluid passing from valve 30 in its partially closed position will cause the fluid to return to its gaseous state in evaporator 29 with consequent absorption of heat. Therefore, if the evaporator 29 were placed in the space 10 instead of the condenser 28, it would be possible to cool the air therein. However, in order to properly accomplish control functions under conditions requiring cooling of the air in space 10, the sensing resistance 17" should have a negative temperature coefficient of resistance so that increases in temperature within the space 10 would result in closing of contacts 15" to actuate valve 30 to induce evaporation of the fluid medium in the evaporator means 29.

Finally, it should also be understood that if the arrangement of valve means 30 is such that it is biased to remain closed, or partially closed, it will be possible to use a sensing resistance 17" having a positive temperature coefficient of resistance to provide a cooling cycle of operation. Similarly, such a resistance may also be employed if the bimetallic element 13" is arranged to maintain contacts 15" normally closed and valve means 30 is biased to its open position. In other words, the operation of the various elements of the sensing control system is interdependent, and the correct relationship between them will be apparent to those skilled in the art.

Figure 4:
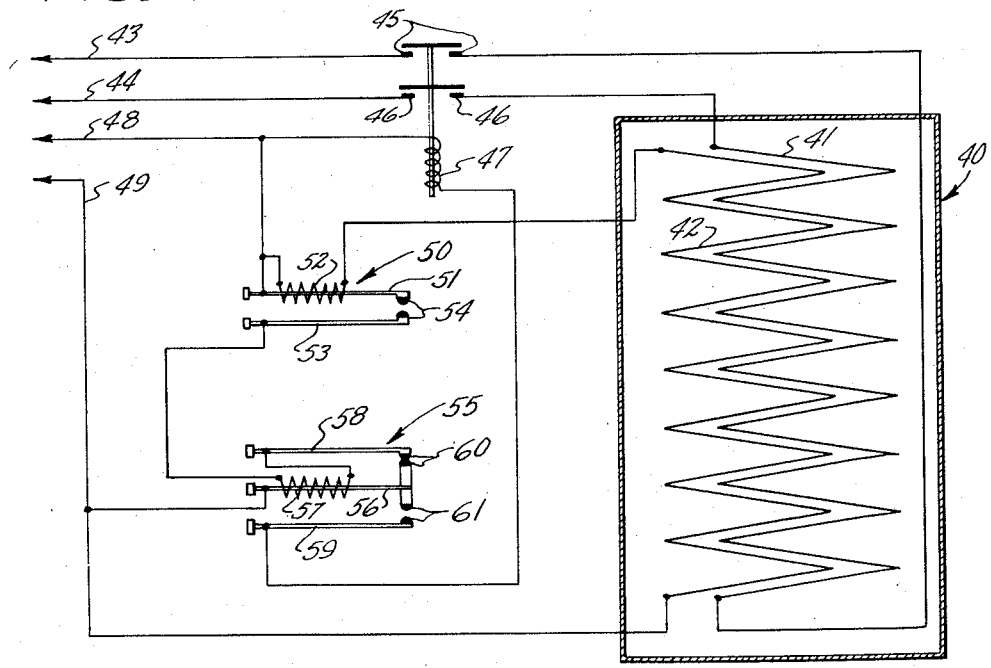
Fig. 4 is a still further modification of the invention as shown in Figs. 1 and 2.

Fig. 4 is a diagrammatic view of a fourth embodiment of the invention. Reference numeral 40 denotes a space having an electrical heating coil 41 and a control element formed into a coil 42. In this form of the invention element 42 has a positive electrical resistance characteristic. Elements 41 and 42 are insulated from each other but adjacent each other so that heat from coil 41 will vary the temperature of coil 42. A double pole switch 45—46 controls the opening and closing of the connections from source wires 43 and 44 to the coil 41. A solenoid 47 presently to be referred to more in detail when energized closes contacts 45—46.

A thermal switch or relay 50 having a bimetallic strip 51 has its strip heated by a surrounding resistance wire 52. This relay or switch 50 is so arranged that when current is supplied to heater wire 52 the arm 51 makes contact with arm 53 by contacts 54 at their free ends closing. Normally at room temperature contacts 54 are open as shown in Fig. 4.

A second thermal relay or switch 55 is provided with a bimetallic arm 56 having a heater coil 57 wound thereon. This relay 55 is so arranged that when electrical energy is supplied to heater coil 57 the bimetallic arm 56 will bend and make contact with its adjacent arm 59 through contacts 61. At normal temperatures the contacts 61 are open. A second pair of contacts 60 forming part of this relay at normal temperature are closed thus normally connecting the bimetallic arm 56 with another arm 58. Flexing of arm 56 when coil 57 becomes heated opens contacts 60 and closes contacts 61.

Lead wires 48 and 49 denote a source of electrical energy which may if desired be the same as lead wires 43 and 44.

Heater 41 and resistance control coil 42 are connected in series across wires 48 and 49, thereby causing contacts 54 to close. This allows current to flow from lead wire 48 through contacts 54 and heater 57. From there the current flows through normally closed contacts 60 and back to lead wire 49. Heater 57 when heated bends bi-metallic wire 56 to close contacts 61. By adjustment of the spring tension on arm 58 contacts 60 may be maintained closed until after contacts 61 have closed. As soon as contacts 61 close current is supplied to coil 47 to close contacts 45 and 46 and energizing heater 41. Arm 56 will continue to bend against arm 59 until contacts 60 open. This causes heater 57 to lose its energy and arm 56 will bend back and again cause contacts 60 to close. This alternate opening and closing of contacts 60 will continue while contacts 61 remain closed as long as energy is supplied through contacts 54.

As the temperature of heater 41 increases, the electrical resistance of control element 42 will increase. This causes less energy to be applied to heater 52. At a predetermined temperature of heater 41 energy to heater 52 will be so reduced that contacts 54 will open, thus stopping the supply of energy to heater 57 for relay 55. This will cause contacts 61 to open and release switch contacts 45 and 46 to their open position. Heater 41 will then drop in temperature and cause a decrease in resistance of control coil 42 and an increase in energy to heater coil 52 thereby again closing contacts 54 to heat coil 57 on bi-metallic arm 56.

It will be understood that the position of arm 53 can be adjusted by any desired or conventional means so that contacts 54 can be made to close and open at any predetermined temperature of the heater 41. Also the position of the arm 59 can be adjusted mechanically or otherwise so that contacts 61 may be made to close at a predetermined time interval after the closing of contacts 54. The position of arm 58 also can be so adjusted that the bimetallic arm 56 will hold contacts 61 closed until a predetermined time interval after the opening of contacts 54.

It will be appreciated that thermal relay switch 55 will be actuated by the full voltage of source 48 and 49 in closing and all electrical energy is disconnected when relay 55 opens. The action of this relay switch 55 in opening and closing is therefore relatively rapid. This enables relay contacts 45 and 46 to open and close quickly and without chatter so that excessive deterioration of its contact points is prevented.

We claim as our invention:

In heating system controls to maintain relatively constant temperature of air in an enclosed space, the combination comprising an electric circuit including an electric heating element to supply heat to said enclosed air in excess of requirements and a thermo-responsive switch means having a self-contained electrical heater means to connect or disconnect said first-mentioned heating element, a second electrical circuit for said second-mentioned electrical heater means including resistance means having electrical conductivity varying with temperature, said second-mentioned heater means being responsive to changes in the conductivity of said variable conductivity means to actuate the thermo-responsive switch means to connect or disconnect said first-mentioned heating element within predetermined limits of said conductivity, and air-circulating means in said space to blow air heated by said heating element from the latter directly to said resistance means, whereby heat from said first-mentioned heating element is received by said resistance means by convection of air.

References Cited in the file of this patent

UNITED STATES PATENTS

| | | |
|---|---|---|
| 1,528,053 | Hands | Mar. 3, 1925 |
| 1,831,151 | Walker | Nov. 10, 1931 |
| 1,996,972 | Parsons | Apr. 9, 1935 |
| 2,510,038 | Rudahl | May 30, 1950 |
| 2,510,039 | Rudahl | May 30, 1950 |
| 2,556,065 | Callender | June 5, 1951 |
| 2,602,132 | Young | July 1, 1952 |